United States Patent
Sambongi et al.

(10) Patent No.: US 8,463,034 B2
(45) Date of Patent: Jun. 11, 2013

(54) IMAGE PROCESSING SYSTEM AND COMPUTER-READABLE RECORDING MEDIUM FOR RECORDING IMAGE PROCESSING PROGRAM

(75) Inventors: Masao Sambongi, Hachioji (JP); Vyacheslav Chesnokov, Loughborough (GB)

(73) Assignees: Olympus Corporation, Tokyo (JP); Apical Limited, London (GB)

( * ) Notice: Subject to any disclaimer, the term of this patent is extended or adjusted under 35 U.S.C. 154(b) by 703 days.

(21) Appl. No.: 12/558,818

(22) Filed: Sep. 14, 2009

(65) Prior Publication Data
US 2010/0054594 A1   Mar. 4, 2010

Related U.S. Application Data

(63) Continuation of application No. PCT/JP2007/055775, filed on Mar. 14, 2007.

(51) Int. Cl.
G06T 5/00 (2006.01)
G06T 5/10 (2006.01)

(52) U.S. Cl.
USPC ............ 382/167; 382/260; 382/274; 382/299

(58) Field of Classification Search
USPC ................. 382/118, 162, 167, 254, 274, 299, 382/260, 264
See application file for complete search history.

(56) References Cited

U.S. PATENT DOCUMENTS

| 2002/0159623 A1 | 10/2002 | Shinbata |
| 2006/0222255 A1 | 10/2006 | Mizuno et al. |
| 2006/0284882 A1 | 12/2006 | Kerofsky et al. |
| 2007/0070214 A1* | 3/2007 | Nakamura ................ 348/222.1 |

FOREIGN PATENT DOCUMENTS

| EP | 1 447 973 | 8/2004 |
| JP | 2001-118062 | 4/2001 |
| JP | 2003-290170 | 10/2003 |
| JP | 2004-021374 | 1/2004 |
| JP | 2004-246456 | 9/2004 |
| JP | 2004-530368 | 9/2004 |
| JP | 2004-312467 | 11/2004 |
| JP | 2006-139368 | 6/2006 |
| WO | 02-045020 | 6/2002 |
| WO | 02-089060 | 11/2002 |
| WO | 20021089060 | 11/2002 |

OTHER PUBLICATIONS

Examination Report issued on Dec. 20, 2011 in counterpart Japanese Patent Application No. 2009-539558.

(Continued)

*Primary Examiner* — Jon Chang
(74) *Attorney, Agent, or Firm* — Volpe and Koenig, P.C.

(57) ABSTRACT

A tone conversion unit, when performing tone conversion on an image signal, performs the tone conversion so as to provide a more appropriate tone to a feature area such as a face extracted from the image signal. Specifically, a correction coefficient calculation unit performs multi-resolution decomposition on a specific signal with the extracted feature area, and sets all pixels of low-frequency component to 1, while setting high-frequency components considered to include noise to 0, so as to calculate a correction coefficient. Then, a correction coefficient processing unit performs a processing of multiplying the correction coefficient to the image signal similarly performed with multi-resolution decomposition.

19 Claims, 15 Drawing Sheets

OTHER PUBLICATIONS

Examination Report issued on Jun. 7, 2011 in counterpart Japanese Patent Application No. 2009-539558.
Office Action dated Sep. 11, 2012 filed in courterpart Japanese Patent Application No. 2009-539558.
Raja Balasubramanian et al., "Multiresolution Color Correction," Proceeding of the SPIE, vol. 3300, pp. 165-172 (1998).
Gaurav Sharma, "Efficient Color Transformation Implementation," Digital Color Imaging Handbook, pp. 715-717, CRC Press, Boca Raton (2003).

* cited by examiner

FIG. 7A  FIG. 7B  FIG. 7C
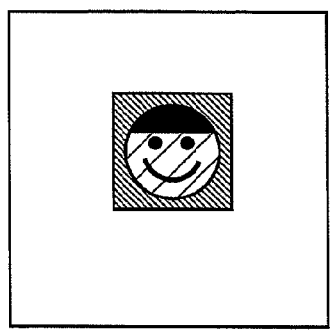 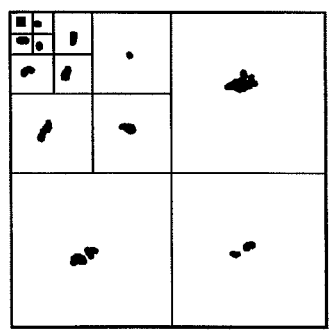 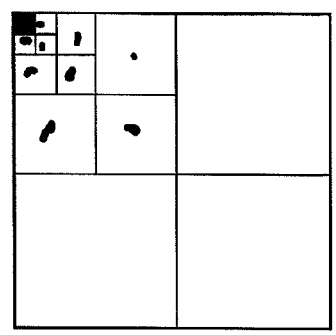
FIG. 8A  FIG. 8B
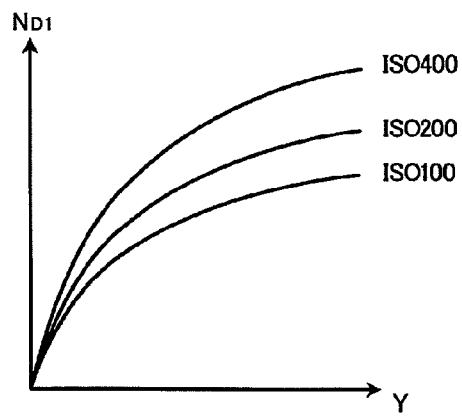 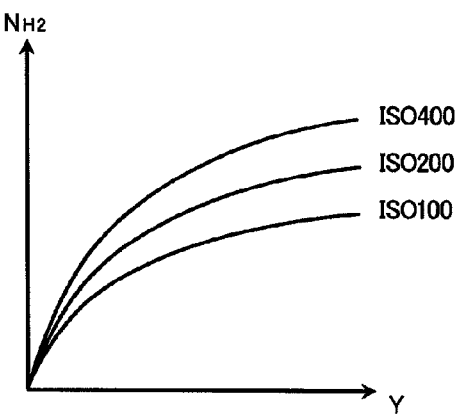

IMAGE PROCESSING SYSTEM AND COMPUTER-READABLE RECORDING MEDIUM FOR RECORDING IMAGE PROCESSING PROGRAM

CROSS REFERENCE TO RELATED APPLICATION

This application is a continuation application of PCT/JP2007/055775 filed on Mar. 14, 2007, the entire contents of which are incorporated herein by this reference.

BACKGROUND OF INVENTION

1. Field of the Invention

The present invention relates to an image processing system and a computer-readable recording medium for recording an image processing program for performing tone conversion to each local area of an image.

2. Description of the Related Art

Recently, a digital still camera and a digital video camera have become popular devices to capture digital image data. These devices include an image processing system, and perform image processing on a captured image in the system. On such a ground, the bit width of an inputted and processed image signal (for example, 10 to 12 bits) in the image processing system is generally set more widely than that of a final output signal (for example, 8 bits) from the image processing system. This setting is for preventing image quality deterioration caused by cancellation of significant digits through the digital signal processing. In this case, it is necessary to convert the bit width of the signal to match the bit width of the output system. Conventionally, such a bit width conversion has been performed by using a fixed (space invariant) tone characteristic to a standard scene.

In another proposed technique, bit width conversion is performed by using the tone characteristic of each scene. For instance, Japanese patent No. 3465226 discloses a method in which an image signal is divided into areas based on texture information; tone conversion is applied independently to each of the divided areas. However, this method requires high computational cost because of the texture analysis and segmentation. Furthermore, this method can not be considered to preserve spatial continuity (not thought to be spatially smooth).

On the other hand, in international patent application publication No. WO 02/089060, disclosing an image processing system, a high computational efficiency method based on local histogram equalization is proposed. However, this method is not adaptable to some regions like face area, thus showing small improvement.

SUMMARY OF THE INVENTION

In an aspect of the present invention, there is provided an image processing system for tone correction processing on an image signal, the image processing system comprising: specific image signal acquisition means for acquiring a specific image signal with a feature area from the image signal; and tone conversion means for executing tone conversion processing on the image signal by using information of the specific image signal with the feature area.

In another aspect of the present invention, there is provided a computer-readable recording medium for recording an image processing program for tone correction processing on an image signal, the image processing program comprising: a specific image signal acquisition step for acquiring a specific image signal with a feature area from the image signal; and a tone conversion step for executing tone conversion processing on the image signal by using information of the specific image signal with the feature area.

BRIEF DESCRIPTION OF THE DRAWINGS

FIGS. 7A to 7C are views for describing a correction coefficient according to the first embodiment.

FIGS. 8A and 8B are graphs showing variations in the amounts of noise N of components $D_1$, $H_2$, respectively, with respect to a luminance value Y using ISO sensitivities 100, 200, and 400 as parameters according to the first embodiment.

DETAILED DESCRIPTION OF THE PREFERRED EMBODIMENT(S)

First Embodiment

Figure 1:
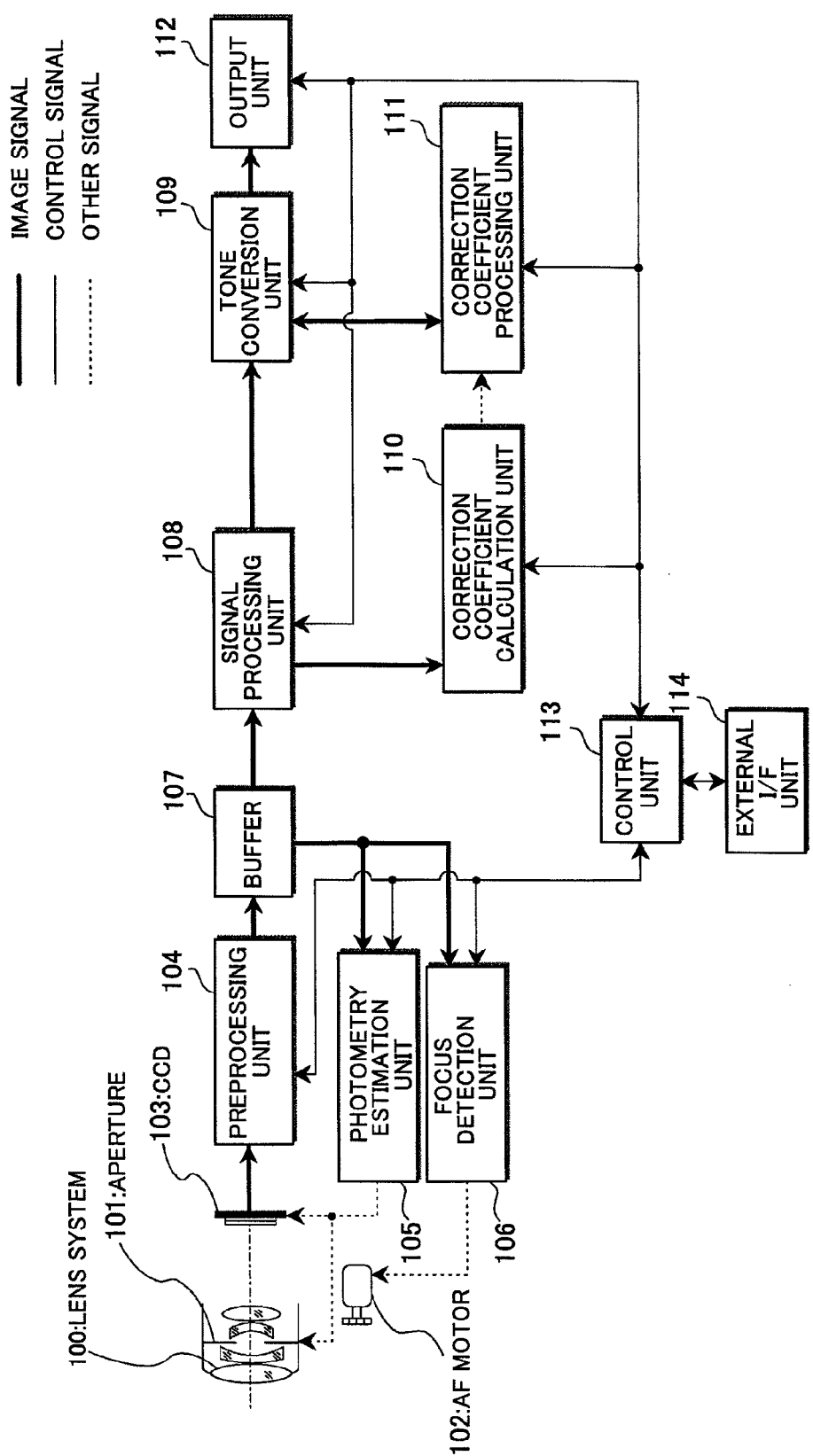
FIG. 1 is a block diagram showing a configuration of an image processing system according to a first embodiment of the present invention.

FIGS. 1 to 9 illustrate a first embodiment of the present invention. FIG. 1 is a block diagram showing a configuration of an image processing system.

As shown in FIG. 1, this image processing system includes a lens system 100 for forming an image of a subject; an aperture 101 which is an opening to admit light; an auto-focus (AF) motor 102 for driving a focus lens included in the lens system 100; a charge coupled device (CCD) 103 that constitutes an image-capturing device for photoelectrically converting an optical subject image formed by the lens system 100 and the aperture 101 to an electrical image signal and outputting an analog signal; a preprocessing unit 104 for amplifying a gain of the analog image signal outputted from the CCD 103 and performing analog-to-digital conversion on the image signal into digital form; a photometry estimation unit 105 for calculating a photometry value to control the aperture 101 and the CCD 103; a focus detection unit 106 for detecting contrast information from the image signal and controlling the AF motor 102 to maximize the contrast information; a buffer 107 for temporarily storing the digital image signal outputted from the preprocessing unit 104; a signal processing unit 108 for performing on the image signal processing such as well-known interpolation for interpolating a lacking color signal in each pixel, white balance, and color conversion; a tone conversion unit 109 serving as tone conversion means for performing tone conversion on the image signal; a correction coefficient calculation unit 110 serving as correction coefficient calculation means for calculating a correction coefficient for the tone conversion; a correction coefficient processing unit 111 serving as correction processing means for performing compensation of tone conversion based on the correction coefficient from the correction coefficient calculation unit 110; an output unit 112 for outputting the image signal processed by the tone conversion unit 109 in order to record and thus save the image signal on, for example, a memory card; an external interface (I/F) unit 114 including a power-on switch, a shutter button, and an interface used for switching between different modes in image-capturing; and a control unit 113 interactively connected to the preprocessing unit 104, the photometry estimation unit 105, the focus detection unit 106, the signal processing unit 108, the tone conversion unit 109, the correction coefficient calculation unit 110, the correction coefficient processing unit 111, the output unit 112, and the external I/F unit 114, and comprising a microcomputer for comprehensively controlling the overall image processing system including these units.

In the above-described configuration, the CCD 103 is connected to the output unit 112 via the preprocessing unit 104, the buffer 107, the signal processing unit 108, and the tone conversion unit 109. The buffer 107 is connected to the photometry estimation unit 105 and the focus detection unit 106. The photometry estimation unit 105 is connected to the aperture 101 and the CCD 103. The focus detection unit 106 is connected to the AF motor 102. The signal processing unit 108 is connected to the correction coefficient calculation unit 110. The correction coefficient calculation unit 110 is connected to the correction coefficient processing unit 111. The correction coefficient processing unit 111 is connected to the tone conversion unit 109.

The flow of signals in the image processing system as shown in FIG. 1 will now be described.

In the image processing system, image-capturing conditions, such as ISO sensitivity, shutter speed and aperture value, can be set via the external I/F unit 114. After these settings have been made, pre-shooting mode is set by pushing the shutter button half-way down. Then, in response to the push of the shutter button, an optical subject image formed by the lens system 100 is converted to an electrical analog image signal by the CCD 103, and the image signal is read out from the CCD 103. The image signal is transferred to the preprocessing unit 104. The preprocessing unit 104 performs pre-processes such as gain amplification and analog-to-digital conversion. The image signal is then transferred to the buffer 107 and is stored therein. The signal processing unit 108 reads the image signal from the buffer 107, and performs well-known interpolation (the interpolation includes a process to interpolate a lacking color component for each pixel as mentioned below), white balance process, and color conversion process. The signal processing unit 108 transfers results of the processes to the tone conversion unit 109 and the correction coefficient calculation unit 110. In this embodiment, the CCD 103 may be one, two or three CODs, and may be of primary-color type or complementary-color type. When one CCD is employed, for example, the signal processing unit 108 performs interpolation to adjust signals from the one CCD to signals suitable for three CCDs. Under control of the control unit 113, the tone conversion unit 109 performs a tone conversion process on the image signal transferred from the signal processing unit 108 using information from the correction coefficient processing unit 111. The tone conversion unit 109 then transfers results of the process to the output unit 112. In this embodiment, the tone conversion process is performed on each color signal. That is to say, if a three primary-color CCD is employed, for example, the tone conversion unit 109 performs tone conversion on each of R (Red), G (Green) and B (Blue) signals. The output unit 112 records and stores the image signal in a memory card.

Figure 2:
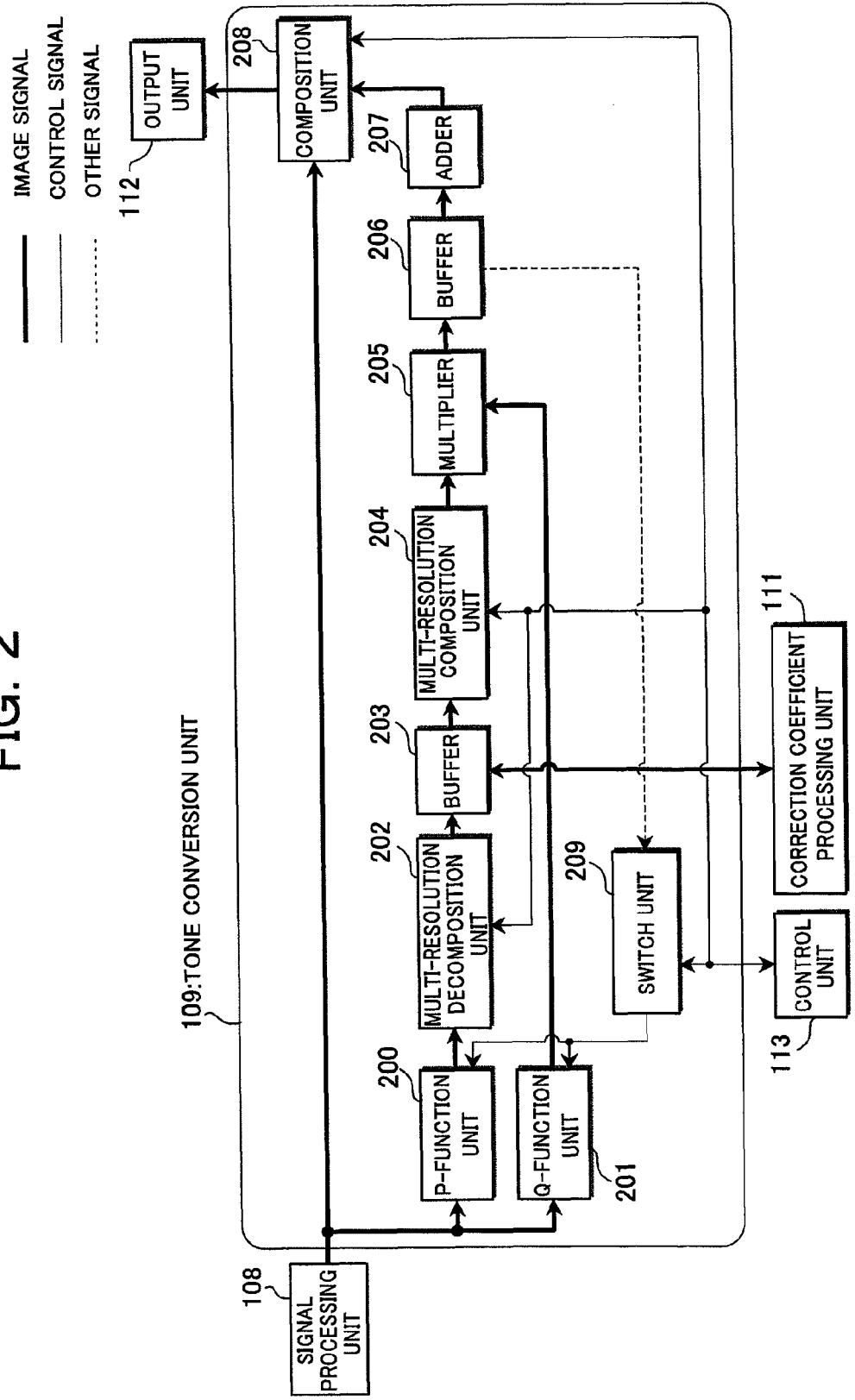
FIG. 2 is a block diagram showing an exemplary configuration of a tone conversion unit according to the first embodiment.

FIG. 2 is a block diagram showing an example of the tone conversion unit 109 shown in FIG. 1. The tone conversion unit 109 of this example includes a P-function unit 200, a Q-function unit 201, a multi-resolution decomposition unit 202 serving as frequency decomposition means and multi-resolution decomposition means, a buffer 203, a multi-resolution composition unit 204 serving as frequency composition means and multi-resolution composition means, a multiplier 205, a buffer 206, an adder 207, a composition unit 208, and a switch unit 209. The composition unit 208 serves as tone correction information calculation means, tone correction processing means, local histogram calculation means, tone correction curve calculation means, and gain calculation means.

The signal processing unit 108 is connected to the P-function unit 200, the Q-function unit 201, and the composition unit 208. The P-function unit 200 is connected to the composition unit 208 via the multi-resolution decomposition unit 202, the buffer 203, the multi-resolution composition unit 204, the multiplier 205, the buffer 206, and the adder 207. The Q-function unit 201 is connected to the multiplier 205. The buffer 203 is connected to the correction coefficient processing unit 111. The buffer 206 is connected to the P-function unit 200 and the Q-function unit 201 via the switch unit 209. The composition unit 208 is connected to the output unit 112. The control unit 113 is interactively connected to and controls the multi-resolution decomposition unit 202, the multi-resolution composition unit 204, the composition unit 208, and the switch unit 209.

The P-function unit 200 and the Q-function unit 201 read out the image signal transferred from the signal processing unit 108, pixel by pixel. Details of these units are described in the aforementioned international patent application publication No. WO 02/089060.

Intensity values I(x, y) for different positions (x, y) of an image are adjusted to generate an adjusted intensity value I'(x, y) in accordance with the following Eq. (1):

$$I'(x, y) = \sum_{i=0}^{M} L[Pi(F(I))] \cdot Qi(F(I)) \quad (1)$$

where Pi(γ) is an orthogonal basis of functions of γ in the range 0<γ<1; Qi( ) are antiderivatives of Pi( ):

$$Qi(F(I)) = \int_0^{F(I)} Pi(\eta) \, d\eta;$$

L[ ] is an operator of multi-resolution filtering, F( ) is a weighting function; and M is the number of orthogonal basis Pi( ) except $P_0$( ) (in other words, M is the possible maximum number of parameter i).

This tone conversion process is based on local histogram equalization. The image signal is processed using the aforementioned (M+1) basis functions (that is 0-th function to M-th function). Therefore the image signal is divided into (M+1) signals.

The first signal from the P-function unit 200 is transferred to the multi-resolution decomposition unit 202. The multi-resolution decomposition unit 202 processes the first signal transferred from the P-function unit 200 using a multi-resolution decomposition method. The first signal is decomposed into high-frequency components and a low-frequency component as described below. The decomposed components are transferred to the buffer 203.

The decomposed signal in the buffer 203 is processed using information from the correction coefficient processing unit 111. For example, the signal in the buffer 203 and the correction coefficient from the correction coefficient unit 111 are multiplied pixel by pixel (using multiplication means). In more detail, the correction coefficient is a coefficient which is decomposed into high-frequency components and a low-frequency component by the correction coefficient calculation unit 110. Then, the correction coefficient processing unit 111 multiplies the signal component and the correction coefficient pixel by pixel on each decomposition level, and rewrites the result on the buffer 203. After that, the processed signal on the buffer 203 is transferred to the multi-resolution composition unit 204.

The multi-resolution composition unit 204 processes the signal transferred from the buffer 203 by using a multi-resolution composition method as described below.

The multiplier 205 performs multiplication process pixel by pixel on the signal transferred from the multi-resolution composition unit 204 and the signal transferred from the Q-function unit 201. This process is performed on the signals having the same parameter i (i.e. Qi and processed Pi both having the same parameter i are multiplied) (see Eq. (1)). These processes are performed using the same method as described in the aforementioned international patent application publication No. WO 02/089060 with the exception of the LPF (low pass filter) unit. That is, as mentioned above, the multi-resolution decomposition unit 202, the buffer 203, and the multi-resolution composition unit 204 are used instead of the LPF in this embodiment. After the multiplication process, the signal is transferred to the buffer 206. The buffer 206 preserves the first signal processed by these units.

The switch unit 209 obtains information of the buffer 206, and judges whether or not the processed signal is the M-th signal. If the signal processed is not the M-th signal, the switch unit 209 controls the P-function unit 200 and the Q-function unit 201 to transfer the next signal. On the other hand, if the buffer 206 has obtained the M-th signal, the switch unit 209 doesn't control the P-function unit 200 and the Q-function unit 201 to transfer the next signal. Consequently the buffer 206 preserves the (M+1) signals processed by the aforementioned units, and these signals are transferred to the adder 207.

The adder 207 calculates the summation of these processed signals pixel by pixel as shown in Eq. (1).

The composition unit 208 calculates the weighted summation of the signal I (x, y) transferred from the signal processing unit 108 and the signal I'(x, y) transferred from the adder 207 as shown in Eq. (2):

$$O(x,y) = \alpha I'(x,y) + (1-\alpha) I(x,y) \quad (2)$$

where O(x, y) is an output signal from the composition unit 208 and α is a weighting coefficient to take the range $0 \leq \alpha \leq 1$. The signal of the composition unit 208 is transferred to the output unit 112.

Figure 3:
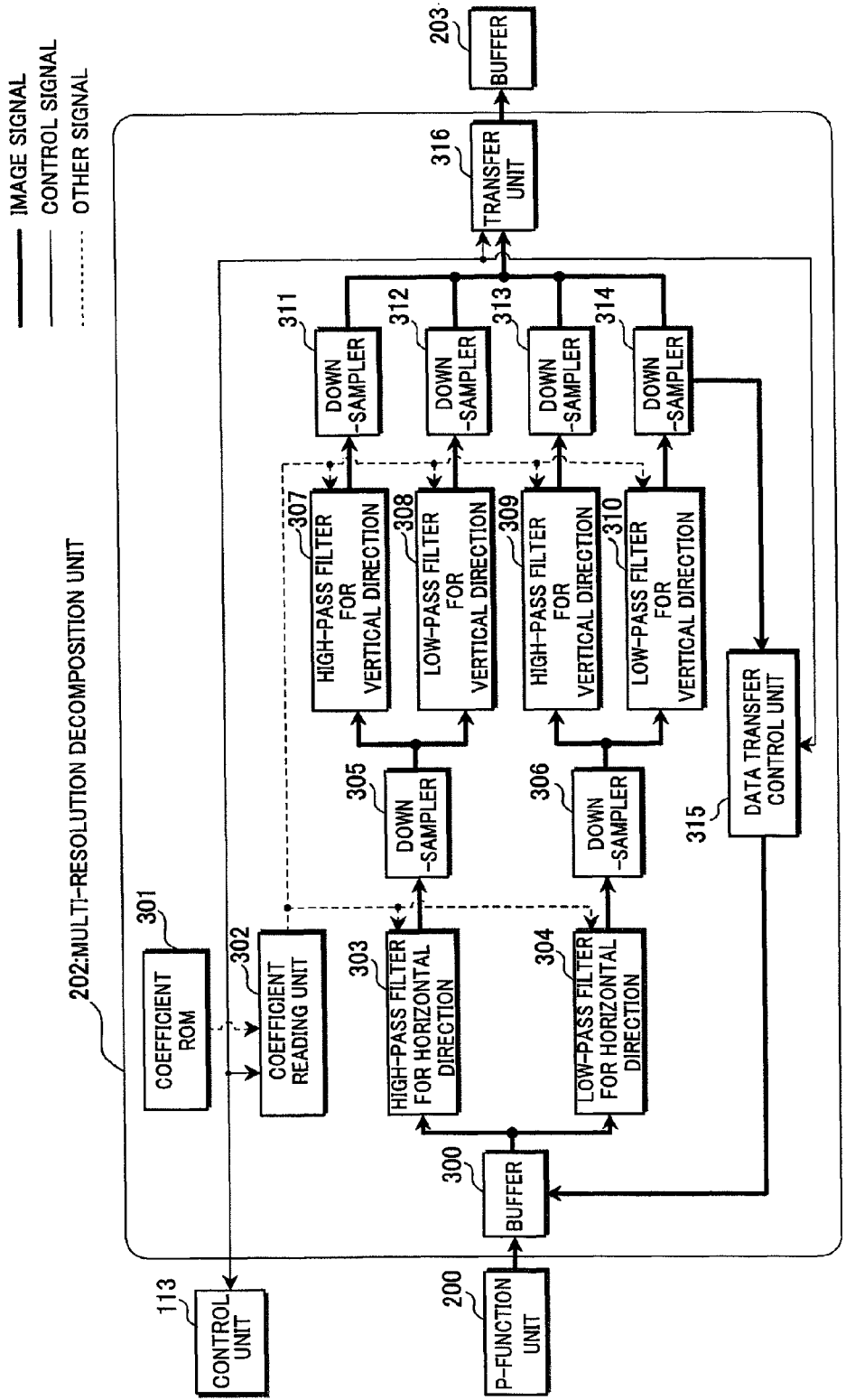
FIG. 3 is a block diagram showing an exemplary configuration of a multi-resolution decomposition unit according to the first embodiment.

FIG. 3 is a block diagram showing an example of the multi-resolution decomposition unit 202 shown in FIG. 2. The multi-resolution decomposition unit 202 of this example includes a buffer 300, a coefficient ROM 301, a coefficient reading unit 302, a high-pass filter for horizontal direction 303, a low-pass filter for horizontal direction 304, down-samplers 305, 306, high-pass filters for vertical direction 307, 309, low-pass filters for vertical direction 308, 310, down-samplers 311, 312, 313, 314, a data transfer control unit 315, and a transfer unit 316. In this example, the multi-resolution decomposition unit 202 serves as wavelet transform means.

The P-function unit 200 is connected to the buffer 300. The buffer 300 is connected to the high-pass filter for horizontal direction 303 and the low-pass filter for horizontal direction 304. The high-pass filter for horizontal direction 303 is connected to the high-pass filter for vertical direction 307 and the low-pass filter for vertical direction 308 via the down-sampler 305. The low-pass filter for horizontal direction 304 is connected to the high-pass filter for vertical direction 309 and the low-pass filter for vertical direction 310 via the down-sampler 306. The high-pass filter for vertical direction 307, the low-pass filter for vertical direction 308, the high-pass filter for vertical direction 309, and the low-pass filter for vertical direction 310 are connected to the transfer unit 316 via the down-samplers 311, 312, 313, 314, respectively. The transfer unit 316 is connected to the buffer 203. The down-sampler 314 is connected to the buffer 300 via the data transfer control unit 315. The coefficient ROM 301 is connected to the high-pass filter for horizontal direction 303, the low-pass filter for horizontal direction 304, the high-pass filter for vertical direction 307, the low-pass filter for vertical direction 308, the high-pass filter for vertical direction 309, and the low-pass filter for vertical direction 310, via the coefficient reading unit 302. The control unit 113 is interactively connected to and controls the coefficient reading unit 302, the data transfer control unit 315, and the transfer unit 316.

The coefficient ROM 301 stores therein filter coefficients for Haar function and Daubechies function in the wavelet transform. Instead of these coefficients, the coefficient ROM 301 may store filter coefficients of Gaussian filter (Gaussian filtering means) and Laplacian filter (Laplacian filtering means). For example, coefficients of high-pass filter and low-pass filter in the Haar function are respectively shown in Eq. (3) and Eq. (4).

The coefficient of high-pass filter={0.5,−0.5}  (3)

The coefficient of low-pass filter={0.5,0.5}  (4)

These filter coefficients are used for both horizontal direction filtering and vertical direction filtering.

Under control of the control unit 113, the coefficient reading unit 302 reads out the filter coefficients from the coefficient ROM 301 before processing. The coefficient reading unit 302 transfers the coefficient of high-pass filter to the high-pass filter for horizontal direction 303, the high-pass filter for vertical direction 307, and the high-pass filter for vertical direction 309. The coefficient reading unit 302 also transfers the coefficient of low-pass filter to the low-pass filter for horizontal direction 304, the low-pass filter for vertical direction 308, and the low-pass filter for vertical direction 310.

Then, the buffer 300 obtains the signal transferred from the P-function unit 200, and transfers the signal to the high-pass filter for horizontal direction 303 and the low-pass filter for horizontal direction 304. Let us say the signal in the buffer 300 as $L_0$, the signal $L_0$ is processed with high-pass filtering at the high-pass filter for horizontal direction 303 and low-pass filtering at the low-pass filter for horizontal direction 304. Each of the down-samplers 305, 306 down-samples the signal to ½ for horizontal direction. Then, in accordance with the aforementioned manner, the signal from the down-sampler 305 is processed by the high-pass filter for vertical direction 307 and the low-pass filter for vertical direction 308 using the coefficient of high-pass filter and the coefficient of low-pass filter, respectively. Likewise, the signal from the down-sampler 306 is processed by the high-pass filter for vertical direction 309 and the low-pass filter for vertical direction 310 using the coefficient of high-pass filter and the coefficient of low-pass filter, respectively. After the filtering, the signals from these filters are down-sampled to ½ by the down-samplers 311, 312, 313, 314 for vertical direction, respectively.

Figure 6:
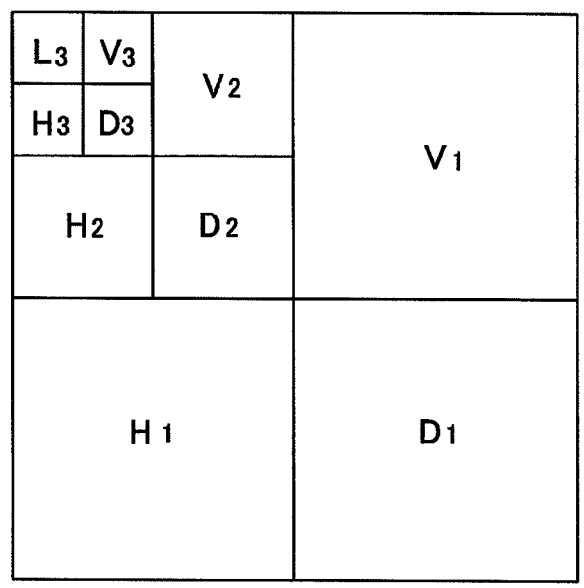
FIG. 6 is a diagram showing an exemplary wavelet decomposition according to the first embodiment.

FIG. 6 shows an example of the wavelet decomposition and the name of each component obtained therein. In this diagram, the horizontal, vertical, diagonal and low-frequency components are named H, V, D and L, respectively. The subscript of each component shows the level of decomposition. Under this naming rule, the outputs of down-samplers 311, 312, 313 are denominated as $D_1$, $V_1$ and $H_1$, respectively, as shown in FIG. 6. The output of the down-sampler 314 is $L_1$ (not shown in FIG. 6). Under control of the control unit 113, the transfer unit 316 transfers the outputs $D_1$, $V_1$ and $H_1$ to the buffer 203. Under control of the control unit 113, the data transfer control unit 315 transfers the component $L_1$ to the buffer 300.

The component $L_1$ in the buffer 300 is decomposed to $D_2$, $V_2$, $H_2$ and $L_2$ according to the same manner as described above. This process is repeated until the n-th decomposition is completed.

After the n-th decomposition step is completed, the component $L_n$ from the down-sampler 314 is also transferred to the buffer 203 by the transfer unit 316. As the result of such processes, the buffer 203 preserves $D_j$, $V_j$, $H_j$ (j=1 to n) and $L_n$.

Figure 4:
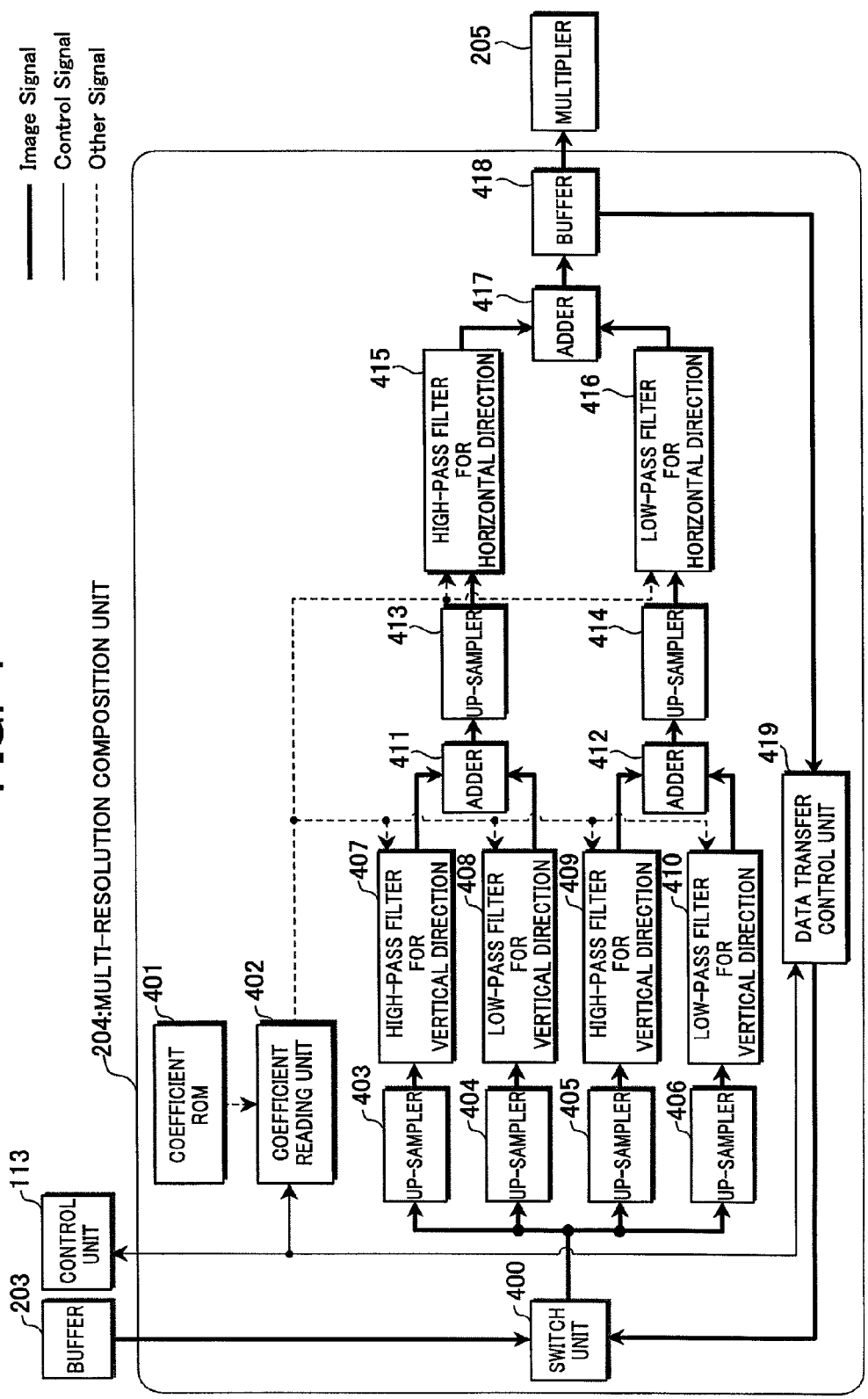
FIG. 4 is a block diagram showing an exemplary configuration of a multi-resolution composition unit according to the first embodiment.

FIG. 4 is a block diagram showing an example of the multi-resolution composition unit 204 shown in FIG. 2.

The multi-resolution composition unit 204 of this example includes a switch unit 400, a coefficient ROM 401, a coefficient reading unit 402, up-samplers 403, 404, 405, 406, high-pass filters for vertical direction 407, 409, low-pass filters for vertical direction 408, 410, adders 411, 412, up-samplers 413, 414, a high-pass filter for horizontal direction 415, a low-pass filter for horizontal direction 416, an adder 417, a buffer 418, and a data transfer control unit 419. In this example, the multi-resolution composition unit 204 serves as wavelet transform means.

The buffer 203 is connected to the switch unit 400. The switch unit 400 is connected to each of the up-samplers 403, 404, 405, 406. The up-samplers 403, 404 are connected to the adder 411 via the high-pass filter for vertical direction 407 and the low-pass filter for vertical direction 408, respectively. The up-samplers 405, 406 are connected to the adder 412 via the high-pass filter for vertical direction 409 and the low-pass filter for vertical direction 410, respectively. The adder 411 is connected to the adder 417 via the up-sampler 413 and the high-pass filter for horizontal direction 415. The adder 412 is connected to the adder 417 via the up-sampler 414 and the low-pass filter for horizontal direction 416. The adder 417 is connected to the multiplier 205 via the buffer 418. The buffer 418 is connected to the switch unit 400 via the data transfer control unit 419. The coefficient ROM 401 is connected, via the coefficient reading unit 402, to each of the high-pass filter for vertical direction 407, the low-pass filter for vertical direction 408, the high-pass filter for vertical direction 409, the low-pass filter for vertical direction 410, the high-pass filter for horizontal direction 415, and the low-pass filter for horizontal direction 416. The control unit 113 is interactively connected to and controls the coefficient reading unit 402 and the data transfer control unit 419.

The coefficient ROM 401 stores therein filter coefficients for Haar function and Daubechies function in the inverse wavelet transform. Instead of these coefficients, the coefficient ROM 401 may store filter coefficients of Gaussian filter (Gaussian filtering means) and Laplacian filter (Laplacian filtering means).

Under control of the control unit 113, the coefficient reading unit 402 reads out the filter coefficients from the coefficient ROM 401 before processing. The coefficient reading unit 402 transfers the coefficient of high-pass filter to the high-pass filters for vertical direction 407, 409 and the high-pass filters for horizontal direction 415. The coefficient reading unit 402 also transfers the coefficient of low-pass filter to the low-pass filters for vertical direction 408, 410 and the low-pass filters for horizontal direction 416.

Subsequently, the switch unit 400 obtains corrected signals $D'_n$, $V'_n$, $H_n$ and $L'_n$, from the buffer 203, and transfers these signals to the up-samplers 403, 404, 405, 406, respectively. Each of the up-samplers 403, 404, 405, 406 up-samples the signal twice for vertical direction. Then, the signals from the up-samplers 403, 405 are processed by the high-pass filters for vertical direction 407, 409, respectively, using the coefficient of high-pass filter. The signals from the up-samplers 404, 406 are processed by the low-pass filters for vertical direction 408, 410, respectively, using the coefficient of low-pass filter. The adders 411, 412 calculate the summation of these processed signals pixel by pixel. Each of the up-samplers 413, 414 up-samples the signal twice for horizontal direction. The high-pass filter for horizontal direction 415 and the low-pass filter for horizontal direction 416 process the signals using the coefficient of high-pass filter and the coefficient of low-pass filter, respectively. The adder 417 calculates the summation of these processed signals pixel by pixel and composes a low-frequency component $L'_{n-1}$. The adder 417 transfers the signal $L'_{n-1}$ to the buffer 418. Under control of the control unit 113, the data transfer control unit 419 transfers the signal $L'_{n-1}$ to the switch unit 400. The switch unit 400 reads out the high-frequency components $D'_{n-1}$, $V'_{n-1}$, $H'_{n-1}$ from the buffer 203. Then, low-frequency component $L'_{n-2}$ is calculated to process the filtering method as described above. These processes are repeated until 0-th component (that is signal $L'_0$) is calculated. Finally, the signal $L'_0$ is transferred to the buffer 418, and this corrected signal is transferred to the multiplier 205.

Figure 5:
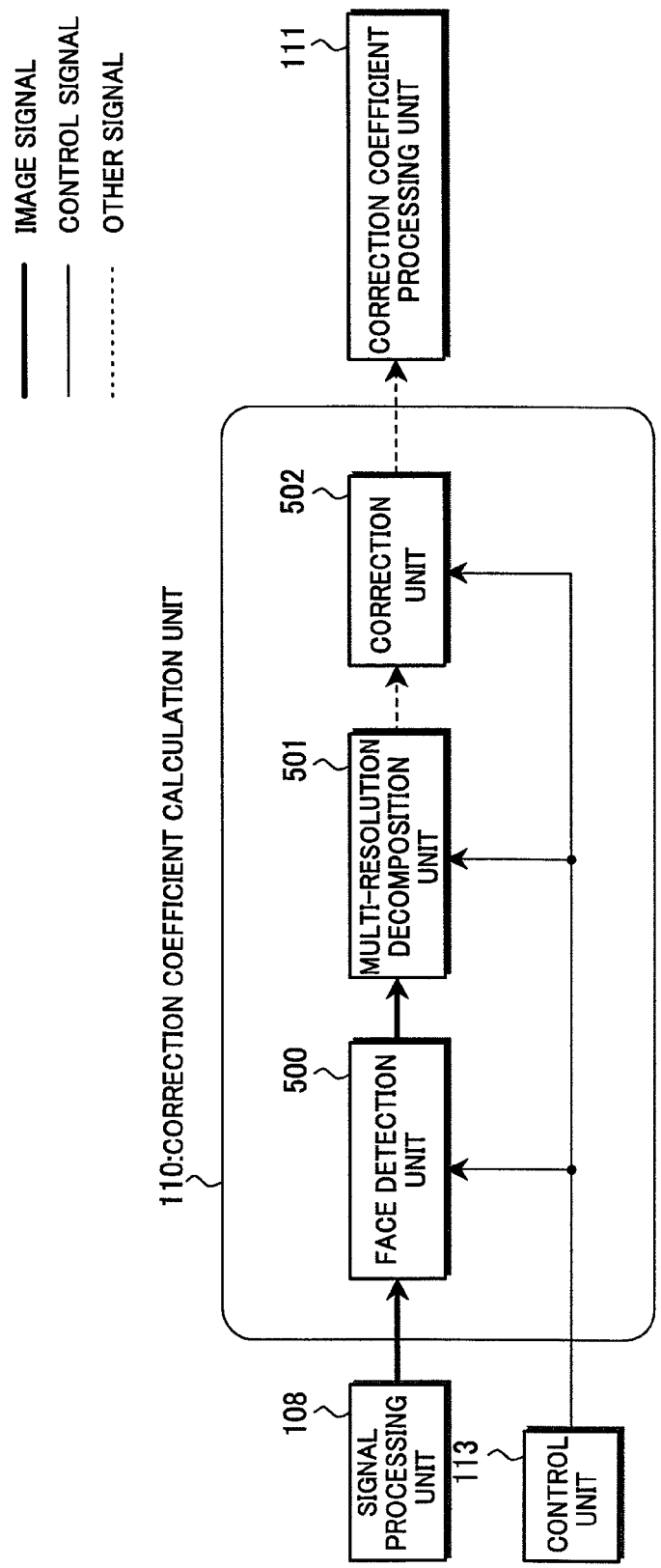
FIG. 5 is a block diagram showing an exemplary configuration of a correction coefficient calculation unit according to the first embodiment.

FIG. 5 is a block diagram showing an example of the correction coefficient calculation unit 110 shown in FIG. 1. The correction coefficient calculation unit 110 of this example includes a face detection unit 500 serving as specific image signal acquisition means, a multi-resolution decomposition unit 501 serving as second multi-resolution decomposition means, and a correction unit 502 serving as high-frequency elimination means.

The signal processing unit 108 is connected to the correction coefficient processing unit 111 via the face detection unit 500, the multi-resolution decomposition unit 501, and the correction unit 502. The control unit 113 is interactively connected to and controls the face detection unit 500, the multi-resolution decomposition unit 501, and the correction unit 502.

Under control of the control unit 113, the face detection unit 500 performs a well-known face detection process on the image signal transferred from the signal processing unit 108. Note that, although the face detection unit 500 is used herein to detect a face as a specific image, no limitation is placed thereon. Instead of this, other processes like significant object detection or object recognition, for example, are also adoptable. Specifically, an object detection unit may be used to detect an object area as the specific image.

FIGS. 7A to 7C are views for describing the correction coefficient. FIG. 7A is a result of the face detection by the face detection unit 500. The face detection process extracts a rectangle or circle area that includes a face image from the image signal. In this process, the image signal except the face area is set to 0 as shown in FIG. 7A (FIG. 7A shows an example when the rectangle area is adopted). After the process, the face detection unit 500 transfers the extracted image to the multi-resolution decomposition unit 501 as the result of the face detection.

The multi-resolution decomposition unit 501 performs multi-resolution decomposition on the image from the face detection unit 500 as shown in FIG. 7B. Here, FIG. 7B shows a multi-resolution decomposition image of FIG. 7A. The multi-resolution decomposition unit 501 transfers information of the multi-resolution decomposition image to the correction unit 502. The correction unit 502 modifies the information of the multi-resolution decomposition image according to the following method:

1. $L_n$ (where n is the maximum level of wavelet decomposition) is set to 1 (This means all the pixels in $L_n$ including an area other than the face area are set to 1). The value is normalized in the range 0 to 1.

2. For all m's to fill the condition m≦i (where i is an arbitrary number smaller than n), $V_m$, $H_m$ and $D_m$ are set as follows: $V_m=0$, $H_m=0$, $D_m=0$.

FIG. 7C shows a correction coefficient obtained by the modification of the decomposed image shown in FIG. 7B. When the correction coefficient is used for multiplication, the low-frequency component is set to 1 because the low-frequency component of the image signal holds significant information. Information of the high-frequency components in the decomposition level may include some noise information. For this reason, the low level components (that is high-frequency components) are eliminated. As shown in FIG. 7C, components except n-level and lower or equal to i-level are as they are.

In the aforementioned method, i, the maximum number of eliminated level levels, is an arbitrary number. So the number i has to be decided by some method. To decide the number i, for example, a maximum value is calculated for each component except the low-frequency component $L_n$ (maximum value calculation means). Then, the number i is decided as the number of the level which has the maximum value in the maximum values (level calculation means).

Other composition for deciding the number i is also available. For example, the number i may be decided on the basis of an amount of noise calculated for each component. FIGS. 8A and 8B show variations in the amount of noise N of components $D_1$, $H_2$ with respect to the luminance value Y using ISO sensitivities 100, 200, and 400 as parameters, with the three curves indicating functions corresponding to these three parameters. Using this noise model, the noise amount is calculated. Then a mean noise value at each component is calculated (high-frequency component noise estimation means). If the mean noise value of a certain component is greater than a predetermined threshold value (this is manually or automatically set by threshold setting means), all values of the component are set to 0 or all values of all components whose level is smaller than or equal to the level of the component are set to 0 (the level calculation means). After this process, the correction unit 502 transfers the correction coefficient to the correction coefficient processing unit 111.

Note that, although hardware processing is a prerequisite in the foregoing description, the present invention is not limited thereto. For example, the image signal outputted from the CCD 103 may be left as unprocessed RAW data, and information, such as ISO sensitivity and size of the image data, may be added to the RAW data, as header information. Then, the RAW data with the header information may be inputted to a processor, such as a computer, so that the processor can process the RAW data by executing an image processing program recorded on a computer-readable recording medium. An example of a process based on the image processing program executed in the computer will now be described with reference to FIG. 9.

Figure 9:
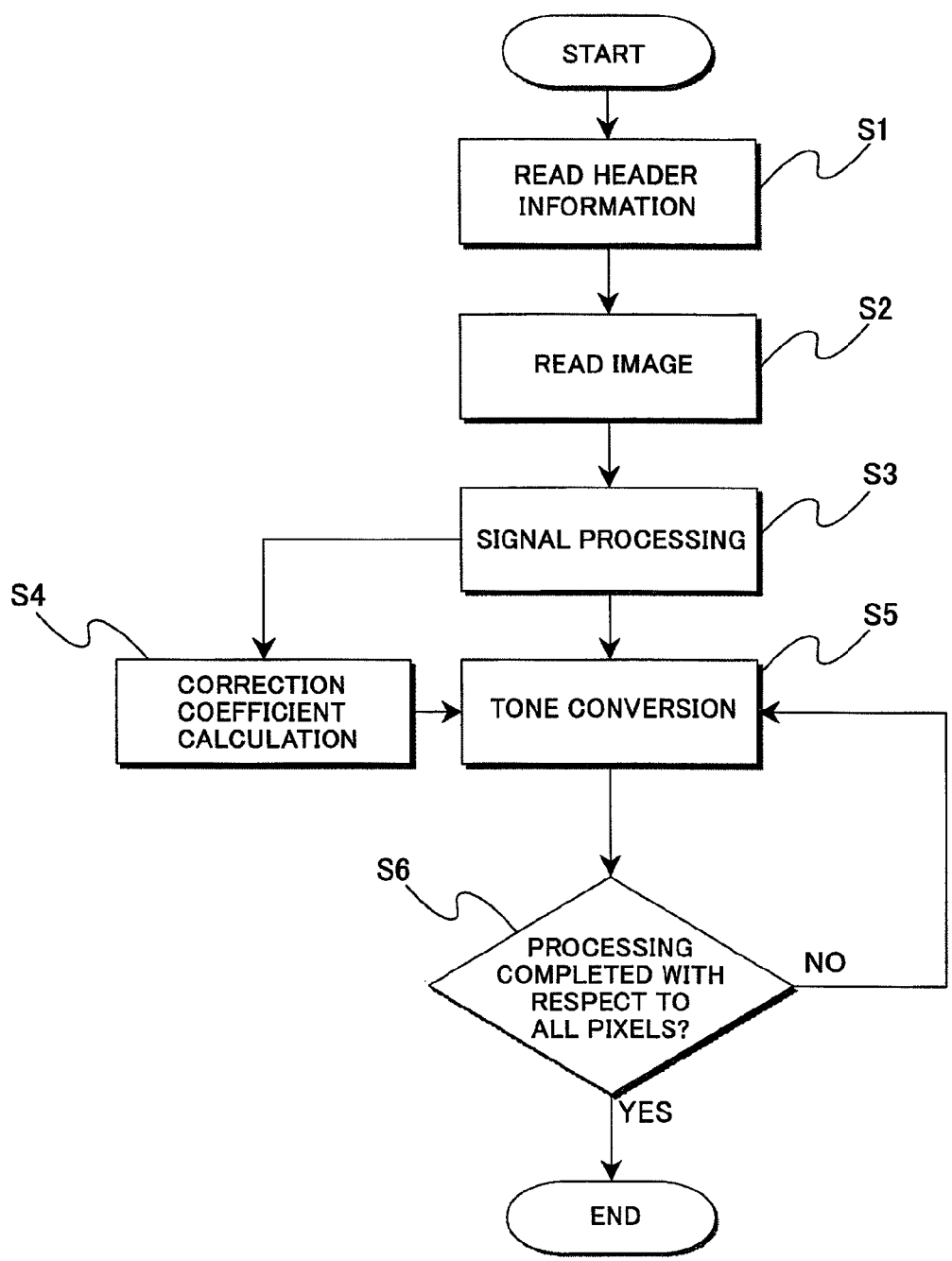
FIG. 9 is a flowchart showing an exemplary software image processing using an image processing program according to the first embodiment.

FIG. 9 is a flowchart showing an exemplary software image processing. Upon starting the processing, the header information, including the ISO sensitivity and the size of the image data, as described above, is read (step S1), and then the image of the RAW data is read (step S2). Then, signal processes such as a well-known interpolation process, a white balance process and a color conversion process are executed (step S3). The correction coefficient is then calculated (step S4), and the tone conversion is executed using the correction coefficient information (step S5). After that, it is determined whether or not the processing is completed with respect to all pixels in the image (step S6). When it is determined that the processing is not completed, the processing returns to step S5 and repeats the above process until completion. On the other hand, when it is determined that the processing is completed with respect to all pixels in step S6, the processing ends.

In this embodiment, the correction coefficient used in tone conversion varies in accordance with a significant area. Therefore, tone conversion corresponding to the significant area is optimized, thus realizing a high quality image.

Additionally, the correction coefficient, which is determined based on noise information, can be estimated with high accuracy.

In contrast, the correction coefficient, which is calculated based on the maximum value of the frequency decomposed components, advantageously allows the processing to be performed comparatively rapidly.

Second Embodiment

Figure 10:
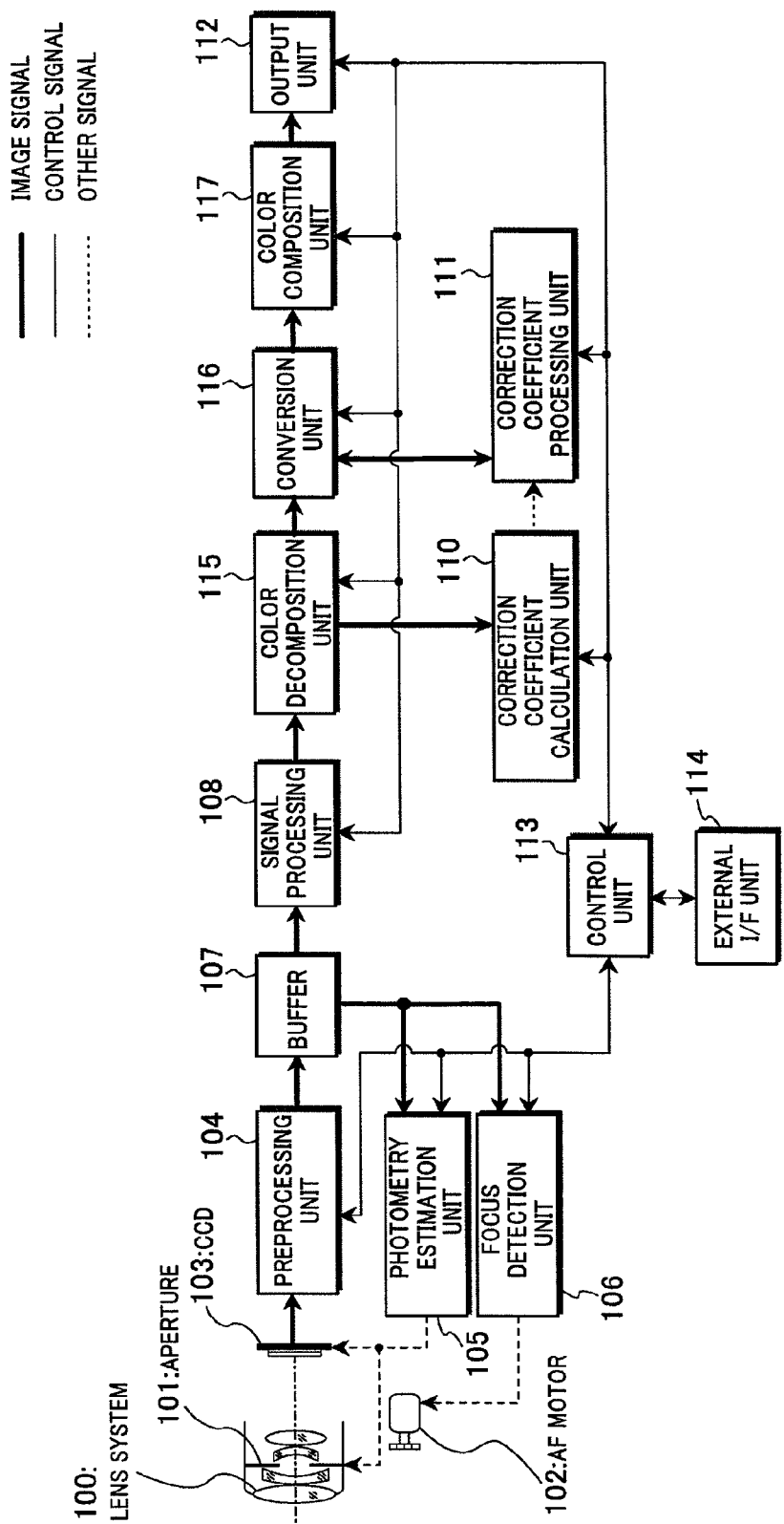
FIG. 10 is a block diagram showing a configuration of an image processing system according to a second embodiment of the present invention.
Figure 11:
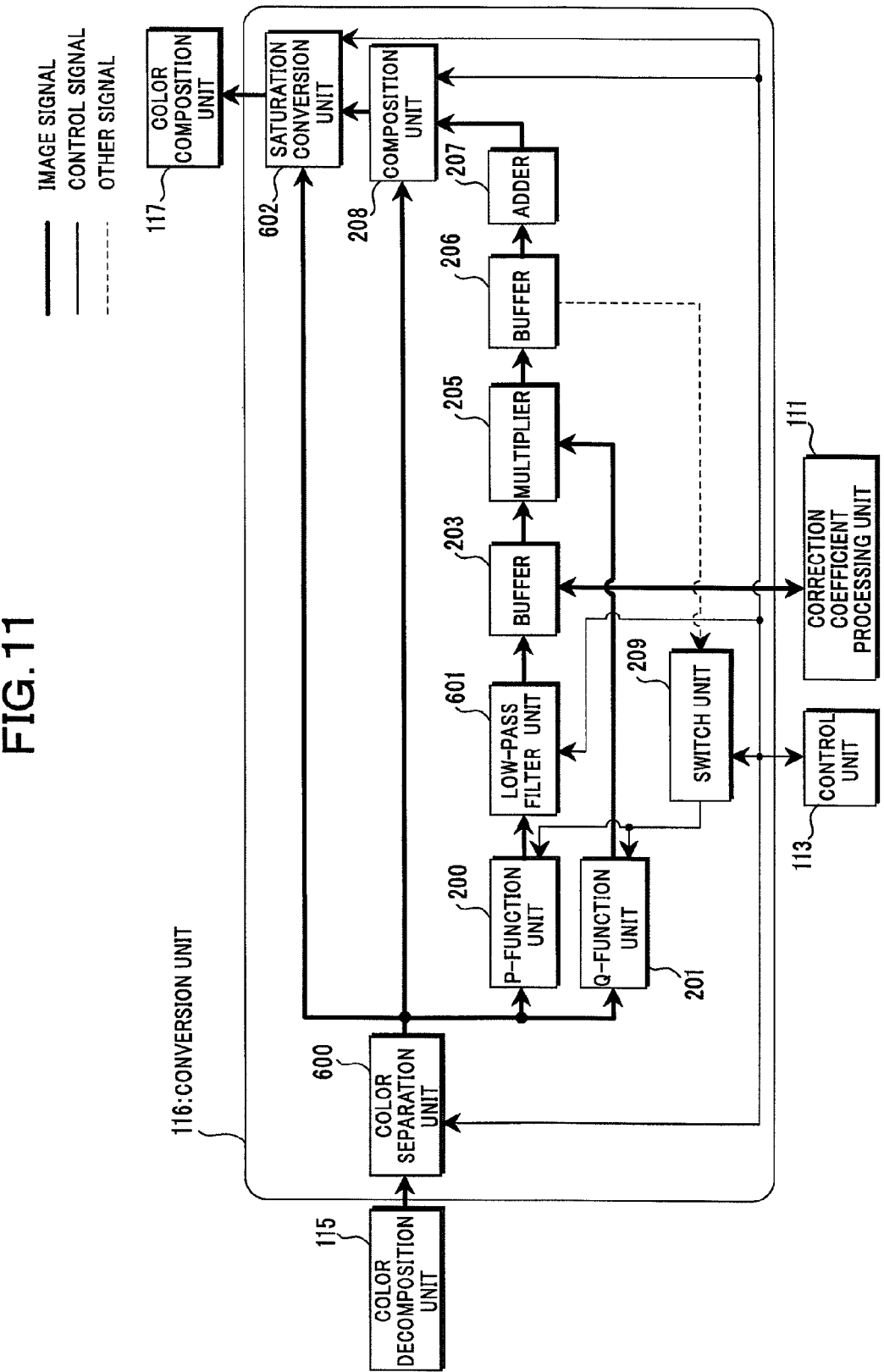
FIG. 11 is a block diagram showing an exemplary configuration of a conversion unit according to the second embodiment.
Figure 12:
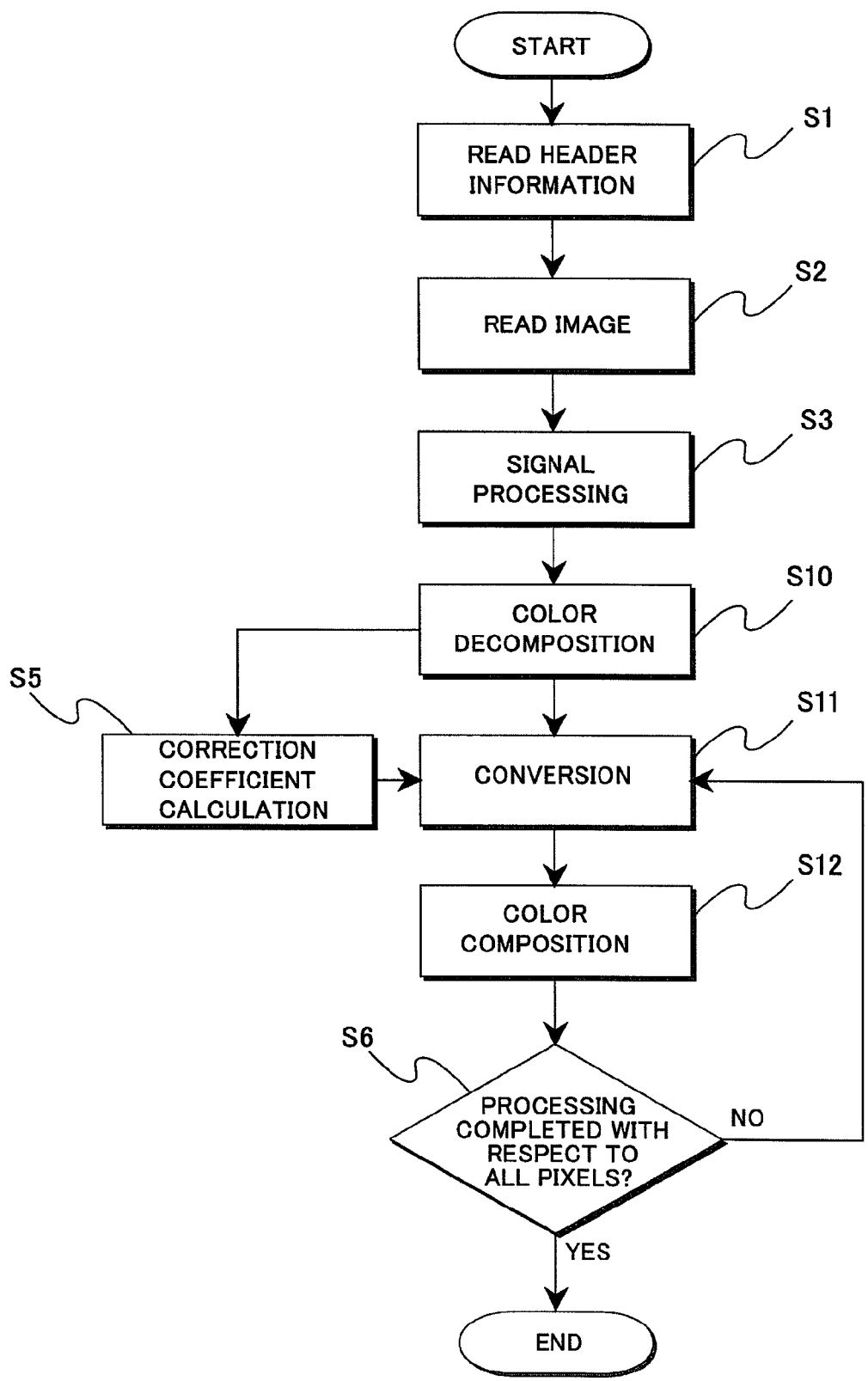
FIG. 12 is a flowchart showing an exemplary software image processing using an image processing program according to the second embodiment.

FIGS. 10 to 12 illustrate a second embodiment of the present invention. FIG. 10 is a block diagram showing a configuration of an image processing system. FIG. 11 is a block diagram showing an exemplary configuration of a conversion unit. FIG. 12 is a flowchart showing an exemplary software image processing using an image processing program.

In this second embodiment, the same reference numerals as in the first embodiment are used for similar parts and descriptions thereof are omitted; differences will be mainly described.

As shown in FIG. 10, the image processing system of the second embodiment is the same as that shown in FIG. 1, except that the tone conversion unit 109 is replaced by a conversion unit 116 serving as tone conversion means and saturation correction means, and that a color decomposition unit 115 serving as color signal decomposition means and a color composition unit 117 serving as color signal composition means are newly added.

The signal processing unit 108 is connected to the color decomposition unit 115. The color decomposition unit 115 is connected to the correction coefficient calculation unit 110 and the conversion unit 116. The correction coefficient processing unit 111 is connected to the conversion unit 116. The conversion unit 116 is connected to the color composition unit 117. The color composition unit 117 is connected to the output unit 112. The control unit 113 is interactively connected also to the color decomposition unit 115, the conversion unit 116, and the color composition unit 117, and controls these units.

The color decomposition unit 115 converts an image signal which is composed, for example, of R, G and B signals from the signal processing unit 108, into another signal such as CIE L*a*b* signals, for example. The color decomposition unit 115 transfers a brightness signal, out of decomposed signals, to the correction coefficient calculation unit 110, and all of the decomposed signals to the conversion unit 116. The conversion unit 116 performs tone correction and saturation correction on the image signal (L*a*b* signals) from the color decomposition unit 115. The color composition unit 117 converts the L*a*b* image signals from the conversion unit 116 into R, G and B image signals.

The flow of signals in the image processing system as shown in FIG. 10 will now be described. The color decomposition unit 115 converts the image signal from the signal processing unit 108 into another signal. When the R, G and B signals are transferred to the color decomposition unit 115, these signals are converted into brightness, saturation and hue signals like CIE L*a*b* or YCbCr signals. The image signal converted into another color space is transferred to the conversion unit 116.

FIG. 11 is a block diagram showing an exemplary configuration of the conversion unit 116. In this block diagram, the same reference numerals as in FIG. 2 are used for similar parts and descriptions thereof are omitted; differences will be mainly described. As shown in FIG. 11, the conversion unit 116 is the same as that shown in FIG. 2, except that the multi-resolution decomposition unit 202 is replaced by a low-pass filter unit 601 serving as low-pass filtering means, that the multi-resolution composition unit 204 is reduced, and that a color separation unit 600 serving as color separation means and a saturation conversion unit 602 serving as saturation correction means are newly added.

The color decomposition unit 115 is connected to the color separation unit 600. The color separation unit 600 is connected to the P-function unit 200, the Q-function unit 201, the composition unit 208, and the saturation conversion unit 602. The P-function unit 200 is connected to the low-pass filter unit 601. The low-pass filter unit 601 is connected to the buffer 203. The buffer 203 is connected to the multiplier 205. The composition unit 208 is connected to the saturation conversion unit 602. The saturation conversion unit 602 is connected to the color composition unit 117. The control unit 113 is interactively connected also to the color separation unit 600, the low-pass filter unit 601, and the saturation conversion unit 602, and controls these units.

The color separation unit 600 separates the image signal from the color decomposition unit 115 into brightness, saturation and hue signals. The brightness signal is transferred to the P-function unit 200, the Q-function unit 201, the composition unit 208, and the saturation conversion unit 602. The saturation and hue signals are transferred to the saturation conversion unit 602. The P-function unit 200 divides the brightness signal into (M+1) signals as described above. The first signal of the P-function unit 200 is transferred to the low-pass filter unit 601. The low-pass filter unit 601 processes the first signal using a well-known low-pass filtering method. After this process, the low-pass filtered signal is transferred to the buffer 203. The multiplier 205 performs multiplication processing pixel by pixel on the signal transferred from the low-pass filter unit 601 and the signal transferred from the Q-function unit 201. The multiplier 205 transfers the signal to the buffer 206. The adder 207 and the composition unit 208 process the signal as described above. The saturation conversion unit 602 compensates the saturation signal. In the saturation conversion unit 602, a brightness gain g is calculated using a brightness signal I(x, y) from the color separation unit 600 and a brightness signal O(x, y) from the composition unit 208 as shown in Eq. (5).

$$g = \frac{O(x, y)}{I(x, y)} \quad (5)$$

The saturation signal s is compensated based on the brightness gain g and the hue signal h as shown in Eq. (6), $$s' = (g \cdot \alpha_h + (1-\alpha_h)) \cdot s \quad (6)$$

where s' is the compensated saturation signal, and $\alpha_h (0 \leq \alpha_h \leq 1)$ is the constant depending on the hue signal h. After this process, the image signal (the brightness signal O(x, y), the saturation signal s', and the hue signal h) is transferred to the color composition unit 117.

Note that, although hardware processing is a prerequisite in this embodiment, the present invention is not limited thereto. The processing may be performed by software.

Referring to FIG. 12, an example of software processing based on the image processing system in a computer will now be described. In FIG. 12, the same processes as those of FIG. 9 in the first embodiment have the same reference numerals and descriptions thereof are omitted. After step S3, the signal is decomposed into brightness, saturation and hue signals (step S10). Then, the conversion process which includes the tone conversion and the saturation conversion is executed using the correction coefficient information (step S11). The signal is then converted to an RGB signal (step S12). The subsequent processes are the same as those in FIG. 9.

According to the second embodiment, substantially the same advantages as described in the first embodiment are realized. In addition, not only the tone conversion but also the saturation conversion is performed, thus a high quality image is achieved.

Third Embodiment

Figure 13:
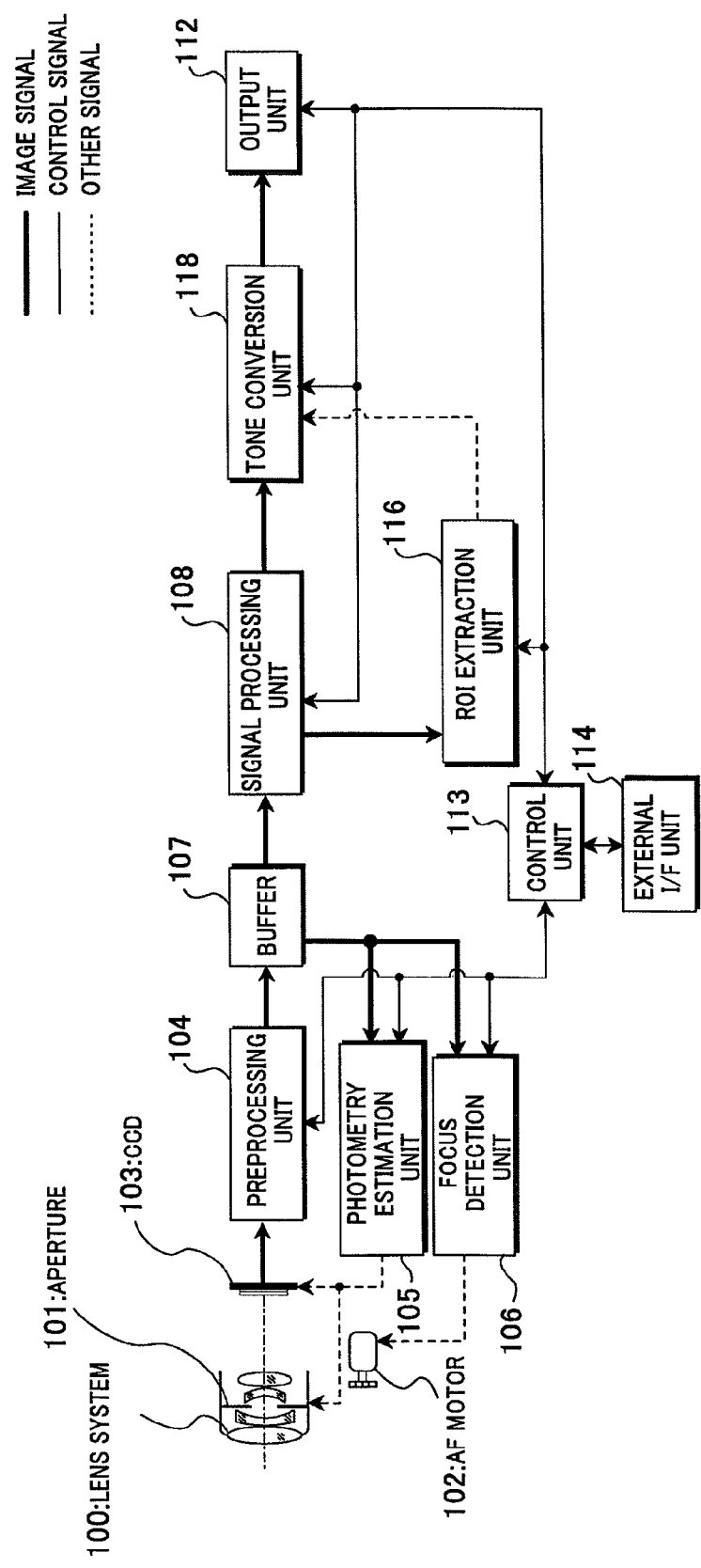
FIG. 13 is a block diagram showing a configuration of an image processing system according to a third embodiment of the present invention.
Figure 14:
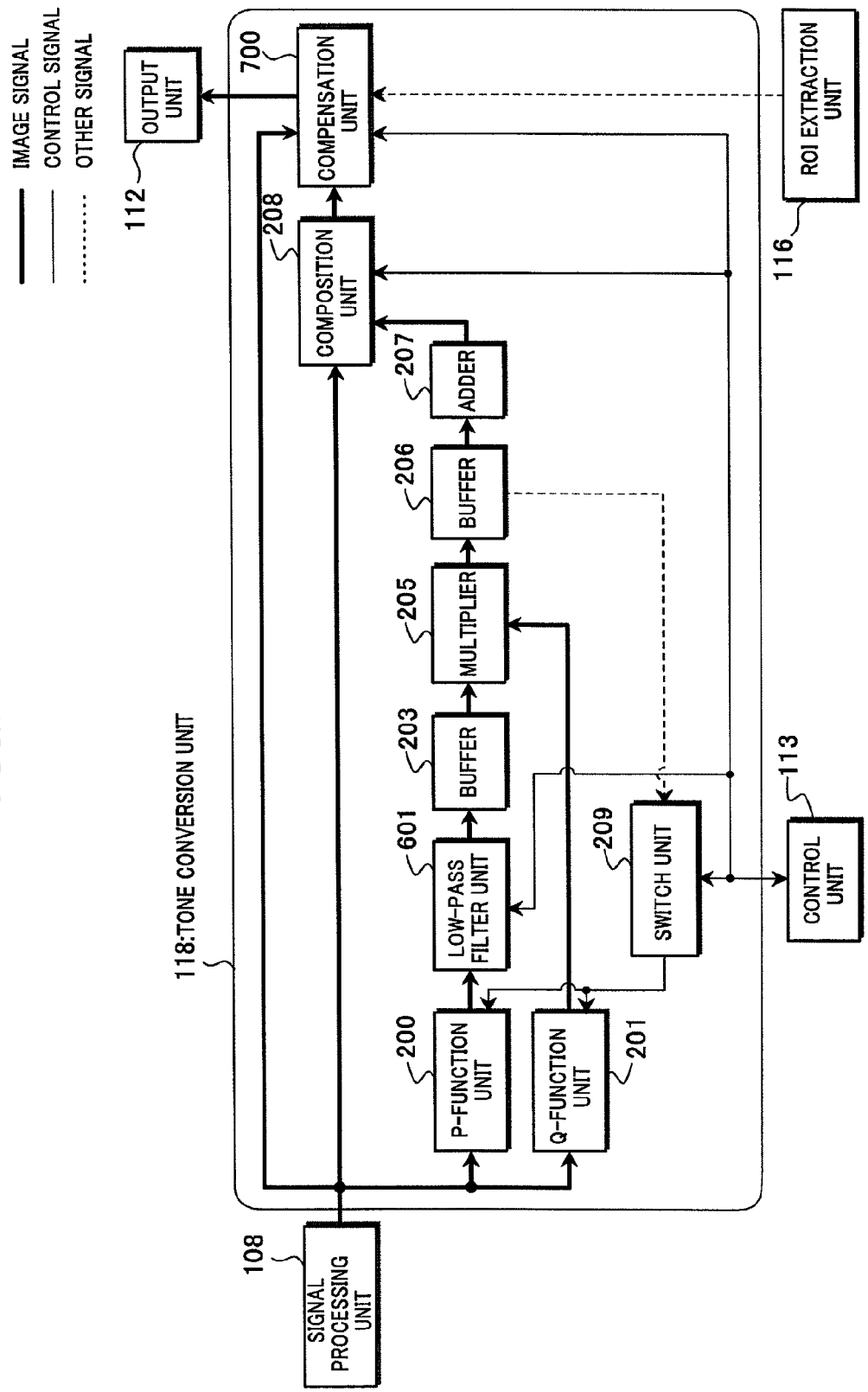
FIG. 14 is a block diagram showing an exemplary configuration of a tone conversion unit according to the third embodiment.
Figure 15A:
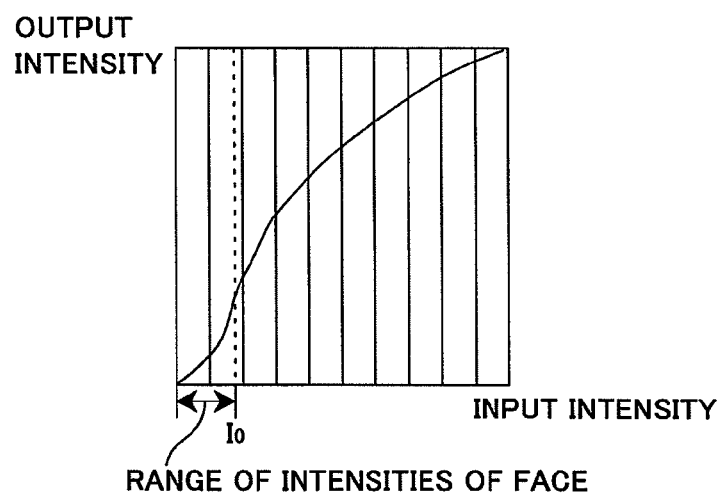
FIGS. 15A and 15B are views each showing a tone curve according to the third embodiment.
Figure 15B:
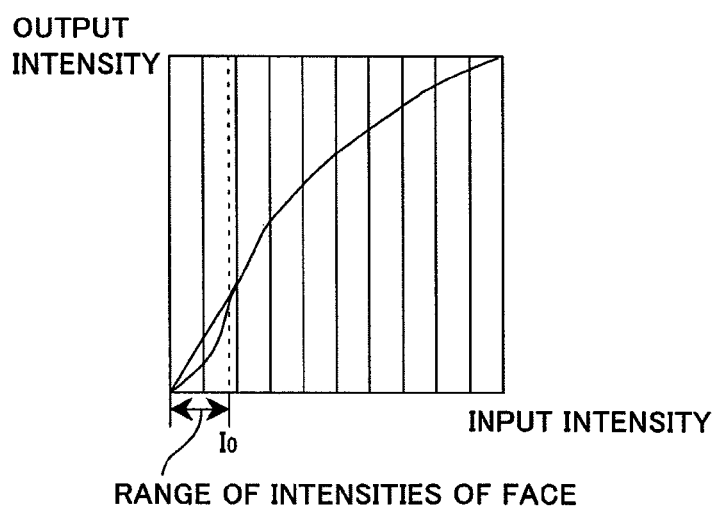
Figure 16:
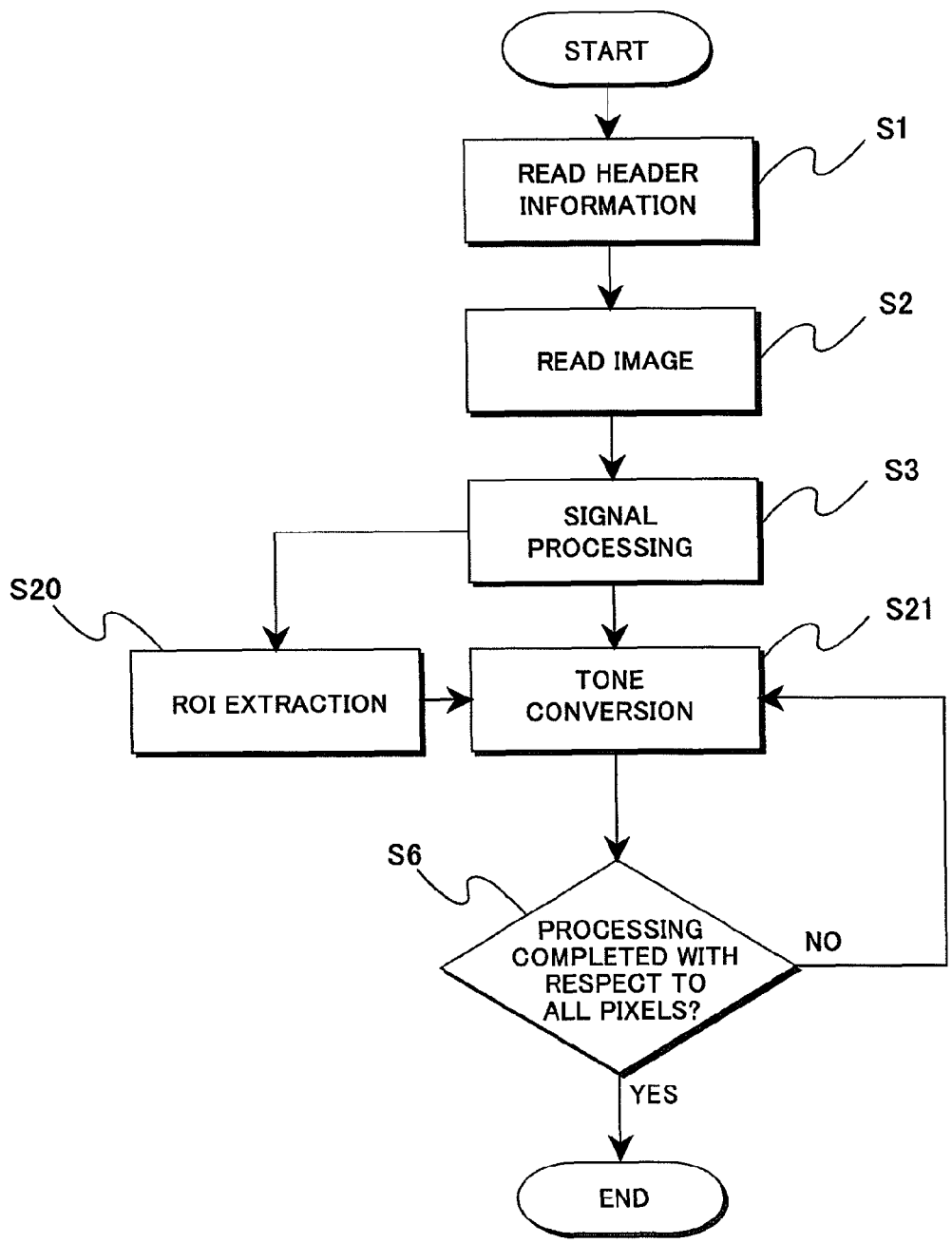
FIG. 16 is a flowchart showing exemplary software image processing using an image processing program according to the third embodiment.

FIGS. 13 to 16 illustrate a third embodiment of the present invention. FIG. 13 is a block diagram showing a configuration of an image processing system. FIG. 14 is a block diagram showing an exemplary configuration of a tone conversion unit. FIGS. 15A and 15B are views each showing a tone curve. FIG. 16 is a flowchart showing an exemplary software image processing using an image processing program.

In this third embodiment, the same reference numerals as in the first embodiment are used for similar parts and descriptions thereof are omitted; differences will be mainly described.

As shown in FIG. 13, the image processing system of the third embodiment is the same as that shown in FIG. 1, except that the tone conversion unit 109 is replaced by a tone conversion unit 118 serving as tone conversion means, that an ROI extraction unit 116 serving as ROI (region of interest) extraction means and specific image signal acquisition means is newly added, and that the correction coefficient calculation unit 110 and the correction coefficient processing unit 111 are reduced.

The signal processing unit 108 is connected to the ROI extraction unit 116 and the tone conversion unit 118. The ROI extraction unit 116 is connected to the tone conversion unit 118. The tone conversion unit 118 is connected to the output unit 112. The control unit 113 is interactively connected also to the ROI extraction unit 116 and the tone conversion unit 118, and controls these units.

Under control of the control unit 113, the tone conversion unit 118 performs a tone conversion process on the image signal transferred from the signal processing unit 108 using information of the ROI (region of interest) extraction unit 111. The tone conversion unit 118 transfers results of the process to the output unit 112.

FIG. 14 is a block diagram showing an exemplary configuration of the tone conversion unit 118. In this block diagram, the same reference numerals as in FIG. 2 are used for similar parts and descriptions thereof are omitted; differences will be mainly described. As shown in FIG. 14, the tone conversion unit 118 is the same as that shown in FIG. 2, except that the multi-resolution decomposition unit 202 is replaced by the low-pass filter unit 601 serving as low-pass filtering means, the multi-resolution composition unit 204 is reduced, and a compensation unit 700 serving as compensation processing means, tone correction processing means, and gain calculation means is added. In this embodiment, the composition unit 208 serves as tone correction information calculation means, local histogram calculation means, and tone correction curve calculation means.

The signal processing unit 108 is connected also to the compensation unit 700. The P-function unit 200 is connected to the low-pass filter unit 601. The low-pass filter unit 601 is connected to the buffer 203. The buffer 203 is connected to the multiplier 205. The composition unit 208 is connected to the compensation unit 700. The compensation unit 700 is connected to the output unit 112. The control unit 113 is interactively connected also to the low-pass filter unit 601 and the compensation unit 700, and controls these units.

The composition unit 208 calculates the weighted summation of the signal transferred from the signal processing unit 108 and the signal transferred from the adder 207 as described in the international patent application publication No. WO 02/089060. The signal of the composition unit 208 is transferred to the compensation unit 700. On the other hand, the ROI extraction unit 116 extracts a region of interest (ROI) (e.g. face area or object area) and calculates the range of intensities of the ROI. The information of the range of intensities (e.g. $I_0$ as shown in FIGS. 15A and 15B) is transferred to the compensation unit 700. The compensation unit 700 compensates the signal from the composition unit 208 by using the information from the ROI extraction unit 116 as shown in FIGS. 15A and 15B. FIGS. 15A and 15B are views each showing a tone curve. In FIG. 15A, the input intensity is of the signal from the signal processing unit 108; the output intensity is of the output signal from the composition unit 208. If the intensity of the signal from the signal processing unit 108 is in the range of intensities of the ROI (In the case of FIGS. 15A and 15B, lower than the intensity Io), the compensation unit 700 compensates the signal from the composition unit 208 as shown in FIG. 15B. That is, the compensation unit 700 performs compensation of, for example, linearizing a tone conversion curve, so as to perform tone conversion to prevent deteriorating the tone of the signal in the range of intensities of the ROI (linearization means). The signal of the compensation unit 700 is transferred to the output unit 112.

With the above-described arrangement, it is possible to obtain a high quality image suitable for a certain region like face area.

Note that, although hardware processing is a prerequisite in this embodiment, the present invention is not limited thereto. The processing may be performed by software.

Referring to FIG. 16, an example of software processing based on the image processing system in a computer will now described. In FIG. 16, the same processes as those of FIG. 9 in the first embodiment have the same reference numerals and descriptions thereof are omitted.

After step S3, the region of interest (ROI) of the image signal is extracted (step S20), and the tone conversion is executed based on the ROI information (step S21). The subsequent processes are the same as those in FIG. 9.

According to the third embodiment, an ideal tone curve is obtained for the ROI of the image signal, thus realizing a high quality image.

The above-described embodiments are to be understood as illustrative examples of the invention only, and further embodiments of the invention may be envisaged. It is to be understood that any feature described in relation to one embodiment may also be used in other embodiments. Furthermore, equivalents and modifications not described above may also be employed without departing from the scope of the invention, which is defined in the accompanying claims.

What is claimed is:

1. An image processing device for tone conversion processing of an image signal, the image processing device comprising:
   a specific image signal acquisition unit configured to acquire a specific image signal with a specific area in the image signal from the image signal;
   a correction coefficient acquisition unit configured to acquire a correction coefficient by using information of the specific image signal with the specific area; and
   a tone conversion unit configured to execute tone conversion processing with contribution by the correction coefficient on an area corresponding to the specific image signal in the image signal and tone conversion processing without contribution by the correction coefficient on an area other than the area corresponding to the specific image signal in the image signal.

2. The image processing device according to claim 1, wherein the tone conversion unit includes:
   a frequency decomposition unit configured to decompose the image signal a plurality of frequency components;
   a correction coefficient calculation unit configured to calculate a correction coefficient on the basis of the specific image signal with the specific area;
   a correction processing unit configured to correct frequency components of the image signal based on the correction coefficient; and a frequency composition unit configured to calculate a corrected image signal by composing the corrected frequency components of the image signal.

3. The image processing device according to claim 2, wherein the frequency decomposition unit includes a multi-resolution decomposition unit configured to decompose the image signal to high-frequency components and low-frequency component up to n-th level (n is a positive integer: n≧1).

4. The image processing device according to claim 3, wherein the frequency composition unit includes multi-resolution composition unit configured to compose a corrected image signal using the high-frequency components and the low-frequency component.

5. The image processing device according to claim 4, wherein the multi-resolution decomposition unit includes a wavelet transform unit; and
the multi-resolution composition unit includes a wavelet transform unit.

6. The image processing device according to claim 4, wherein the multi-resolution decomposition unit includes a Gaussian filtering unit and a Laplacian filtering unit; and
the multi-resolution composition unit includes a Gaussian filtering unit and a Laplacian filtering unit.

7. The image processing device according to claim 2, wherein the correction coefficient calculation unit includes:
a second multi-resolution decomposition unit configured to decompose the specific image signal with the specific area to high-frequency components and a low-frequency component up to n-th level (n is a positive integer: n≧1); and
a high-frequency elimination unit configured to set the high-frequency components to zero while the decomposition level is smaller than or equal to i-th level (i is a positive integer which fills the condition 1≦i<n).

8. The image processing device according to claim 7, wherein the high-frequency elimination unit comprises:
a maximum value calculation unit configured to calculate a maximum value of the high-frequency components at each decomposition level; and
a level calculation unit configured to calculate a level i based on the maximum value at the each decomposition level.

9. The image processing device according to claim 7, wherein the high-frequency elimination unit comprises:
a high-frequency component noise estimation unit configured to estimate a noise amount in the high-frequency components at each decomposition level;
a threshold setting unit configured to set a threshold for the noise amount; and
a level calculation unit configured to calculate a level i based on the threshold.

10. The image processing device according to claim 2, wherein the correction processing unit includes a multiplier for multiplying the image signal by the correction coefficient.

11. The image processing device according to claim 1, wherein the specific image signal acquisition unit extracts a specific image signal which includes an object area corresponding to the specific area from the image signal.

12. The image processing device according to claim 1, wherein the specific image signal acquisition unit extracts a specific image signal which includes a face area corresponding to the specific area from the image signal.

13. The image processing device according to claim 1, wherein the specific image signal acquisition unit includes an ROI extraction unit configured to extract an ROI (Region of Interest) of the specific image signal with the specific area; and the tone conversion unit includes:
a low-pass filter configured to filter the image signal;
a tone conversion information calculation unit configured to calculate information of tone conversion using the image signal and the image signal filtered by the low-pass filter;
a tone conversion processing unit configured to execute tone conversion processing on the image signal using the tone conversion information; and
a compensation processing unit configured to compensate the tone conversion processing on the image signal based on a range of intensities of the image signal in the ROI.

14. The image processing device according to claim 13, wherein the compensation processing unit includes a linearization unit configured to linearize a tone conversion curve within a range of intensities of the image signal in the ROI.

15. The image processing device according to claim 1, wherein pixel values in an area other than the specific area in the image signal is set 0 when the specific image signal with the specific area is acquired from the image signal.

16. A non-transitory computer-readable recording medium with an image processing program stored therein for tone conversion processing of an image signal, the image processing program instructing a computer to perform:
a specific image signal acquisition step to acquire a specific image signal with a specific area in the image signal from the image signal;
a correction coefficient acquisition step to acquire a correction coefficient by using information of the specific image signal with the specific area; and
a tone conversion step to execute tone conversion processing with contribution by the correction coefficient on an area corresponding to the specific image signal in the image signal and tone conversion processing without contribution by the correction coefficient on an area other than the area corresponding to the specific image signal in the image signal.

17. The non-transitory computer-readable recording medium according to claim 16, wherein the tone conversion step includes:
a frequency decomposition step to decompose the image signal a plurality of frequency components;
a correction coefficient calculation step to calculate a correction coefficient on the basis of the specific image signal with the specific area;
a correction processing step to correct frequency components of the image signal based on the correction coefficient; and
a frequency composition step to calculate a corrected image signal by composing the corrected frequency components of the image signal.

18. The non-transitory computer-readable recording medium according to claim 16, further comprising a step to set pixel values in an area other than the specific area in the image signal to 0 when the specific image signal with the specific area is acquired from the image signal.

19. A method for tone conversion processing of an image signal, comprising:
a specific image signal acquisition step to acquire a specific image signal with a specific area in the image signal from the image signal;
a correction coefficient acquisition step to acquire a correction coefficient by using information of the specific image signal with the specific area; and a tone conversion step to execute tone conversion processing with contribution by the correction coefficient on an area corresponding to the specific image signal in the image signal and tone conversion processing without contribution by the correction coefficient on an area other than the area corresponding to the specific image signal in the image signal.

* * * * *